United States Patent

Diehl et al.

Patent Number: 5,915,206
Date of Patent: Jun. 22, 1999

[54] PROCEDURE FOR THE DETECTION OF SCART TYPE CONNECTIONS IN A HOME SYSTEMS NETWORK

[75] Inventors: Eric Diehl; Helmut Bürklin; Rlad Kouba, all of Strasbourg; Pascal Saucy, Geispolsheim, all of France

[73] Assignee: Thomson multimedia S.A., Courbevoie, France

[21] Appl. No.: 08/549,154

[22] Filed: Oct. 27, 1995

[51] Int. Cl.$^6$ ...................................................... H04N 5/76
[52] U.S. Cl. ............................................... 455/6.3; 348/6
[58] Field of Search ............................ 348/6, 7, 10, 12, 348/13, 705, 5, 8, 9, 706, 1; 455/2, 4.1, 3.2, 4.2, 5.2, 6.1, 6.2, 6.3; 386/46, 113; H04N 5/76

[56] References Cited

U.S. PATENT DOCUMENTS

| | | | |
|---|---|---|---|
| 4,947,244 | 8/1990 | Fenwick et al. | 358/86 |
| 5,349,391 | 9/1994 | Spiero et al. | 348/705 |
| 5,373,557 | 12/1994 | Diehl et al. | 380/20 |
| 5,434,628 | 7/1995 | Spiero et al. | 348/705 |
| 5,570,198 | 10/1996 | Cho | 386/46 |
| 5,574,965 | 11/1996 | Welmer | 455/3.2 |

FOREIGN PATENT DOCUMENTS 409702 of 0000 European Pat. Off. .
497073 of 0000 European Pat. Off. .

*Primary Examiner*—Nathan Flynn
*Attorney, Agent, or Firm*—Joseph S. Tripoli; Frederick A. Wein

[57] ABSTRACT

The purpose of this invention is a process for the detection of SCART type connections in a home systems network.

This process includes the following steps:
a) disactivate video sources connected to the network,
b) put video receivers connected to the network on standby,
c) send a video signal from a first video source,
d) detect switched on video receivers,
e) memorize the connection between the said first source and the said switched on video receivers, if any,
f) disactivate the first said source, and put switched on video receivers on standby,
g) repeat the process starting from step c, with each remaining source.

6 Claims, 3 Drawing Sheets

PROCEDURE FOR THE DETECTION OF SCART TYPE CONNECTIONS IN A HOME SYSTEMS NETWORK

This invention concerns a process for the detection of SCART type connections between different appliances in a home systems network. The invention is useful for home systems applications.

FIG. 1 illustrates the problem that arises. A home systems bus 1 connects various appliances or devices such as television sets 2 and 3 and a VCR 4. The television set 3 and the VCR 4 are also connected through a SCART (Syndicat des Constructeurs d'Appareils Radio-récepteurs at Télévision—Association of Radio and Television Manufacturers) type connector. The SCART connector is described in European standard EN 50 049.

The home systems network also includes a central control unit 5. This control unit can control some functions of appliances connected to the network. This central unit cannot necessarily directly control the connection through a SCART connection.

When in "Standby" mode, some appliances react to a signal on some of the pins in the SCART connectors to which they are connected. This is the case for example for pin 8. The television set 3 can detect an emission from the VCR 4, by monitoring the status of this pin. When there is an active signal on this pin, the television set 3 automatically switches to "On" mode, and selects the active SCART connector as video source. This automatic detection means that a cassette can be shown simply by operating the VCR only. All that is necessary is to switch on the VCR and to start to play the cassette: the television set is automatically switched on to show the cassette.

In a home systems network, video signals from a video source such as the VCR 4 could be shown on a television set other than 3. Video signals are then sent through a network channel to a display unit such as television set 2, for example located in a room other than the room containing appliances 3 and 4. This transmission is controlled by the central unit 5. For example, the physical transmission medium consists of coaxial cables and/or radio frequency links.

The effect of sending video signals from the VCR 4 is to accidentally switch on the television set 3 through the SCART connector, although the user may be in another room.

The purpose of this invention is a process for the detection of SCART type connections in a home systems network, including the following steps:

a) disactivate video sources connected to the network,
b) put video receivers connected to the network on standby,
c) send a video signal from a first video source,
d) detect switched on video receivers,
e) memorize the connection between the said first source and the said switched on video receivers, if any,
f) disactivate the said first source, and put switched on video receivers on standby,
g) repeat the process starting from step c, with each remaining source.

A SCART type connection refers to a connection between at least two appliances that activates at least one of the said appliances, called the receiver, when one of the appliances called the source transmits a signal on the said connection.

According to one method of use, the said process is applied when a now video source, or a new video receiver is installed in the network.

According to one method of use, the said process is applied on the initiative of a User.

According to one method of use, connections are memorized to put video receivers on standby, if they were accidentally switched on at the same time as switching on a video source for which these connections exist.

Another purpose of the invention is a process for the detection of SCART type connections in a home systems network, including the following steps:

a) disactivate video sources connected to the network,
b) put video receivers connected to the network on standby,
c) send a video signal from a group of video sources,
d) detect if no video receivers are switched on, and in this case disactivate the video sources in the said group and repeat step c with the next group of video sources.
e) if at least one switched on video receiver is detected, detect connections for this group of video sources using the process described above, the said group being considered as forming all video sources in the network for application of the said process.
f) repeat step c, with the next group of video sources.

This distribution into groups of video sources means that a large number of sources can be processed at the same time, which is particularly desirable when the network does not contain many SCART type connections.

Another purpose of the invention is a process for the detection of SCART type connections in a home systems network, including the following steps:

a) put video receivers connected to the network on standby,
b) send video signals from all video sources in the network,
c) detect whether or not any video receivers are switched on,
d) if there are no video receivers switched on, conclude that no such connections exist,
e) if there are any video receivers switched on, distribute video sources on the network into at least two groups and proceed with the following steps:
f) put video receivers connected to the network on standby,
g) for each group, send a video signal from the sources in the said group,
h) detect whether or not any video receivers are switched on,
i) if there are no video receivers switched on, conclude that no such connections exist,
j) If there are some video receivers switched on, separate the said sources belonging to each group, into subgroups
k) repeat steps f to j for each group, sub-group or smaller set until all sets formed contain a limited number of video sources.

This is a pyramid type detection process: source sets on which action is taken in common become smaller and smaller, until they reach a limited size.

In one specific method of use, with the said limited number being strictly greater than 1, the process according to one of the above descriptions is used to detect the said connections, the said set containing the said limited number of video sources being considered as forming the set of network video sources for application of the said process.

According to one special method of use, in which the limited number is equal to 1, step h includes a step for storing the existence of a connection between the said video source of the said set and the said video receivers that are switched on.

In this specific method, the pyramid procedure is continued until all sets are reduced to a single video source. The connection is then identified immediately.

Other characteristics and advantages of the invention will become clear with reference to a non-limitative specific example illustrated by the figures, in which:

FIG. 1 described above shows a block diagram of home systems network equipment,

The same references are used for the same elements on each figure.

Figure 1:
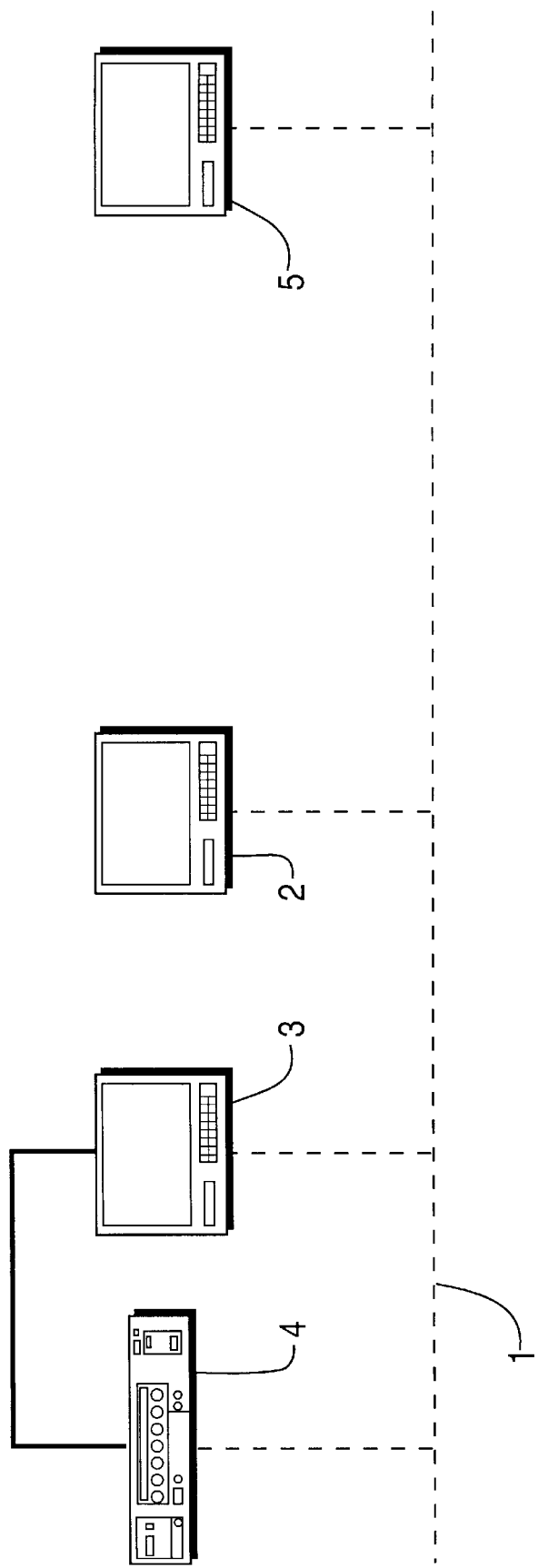
Figure 2:
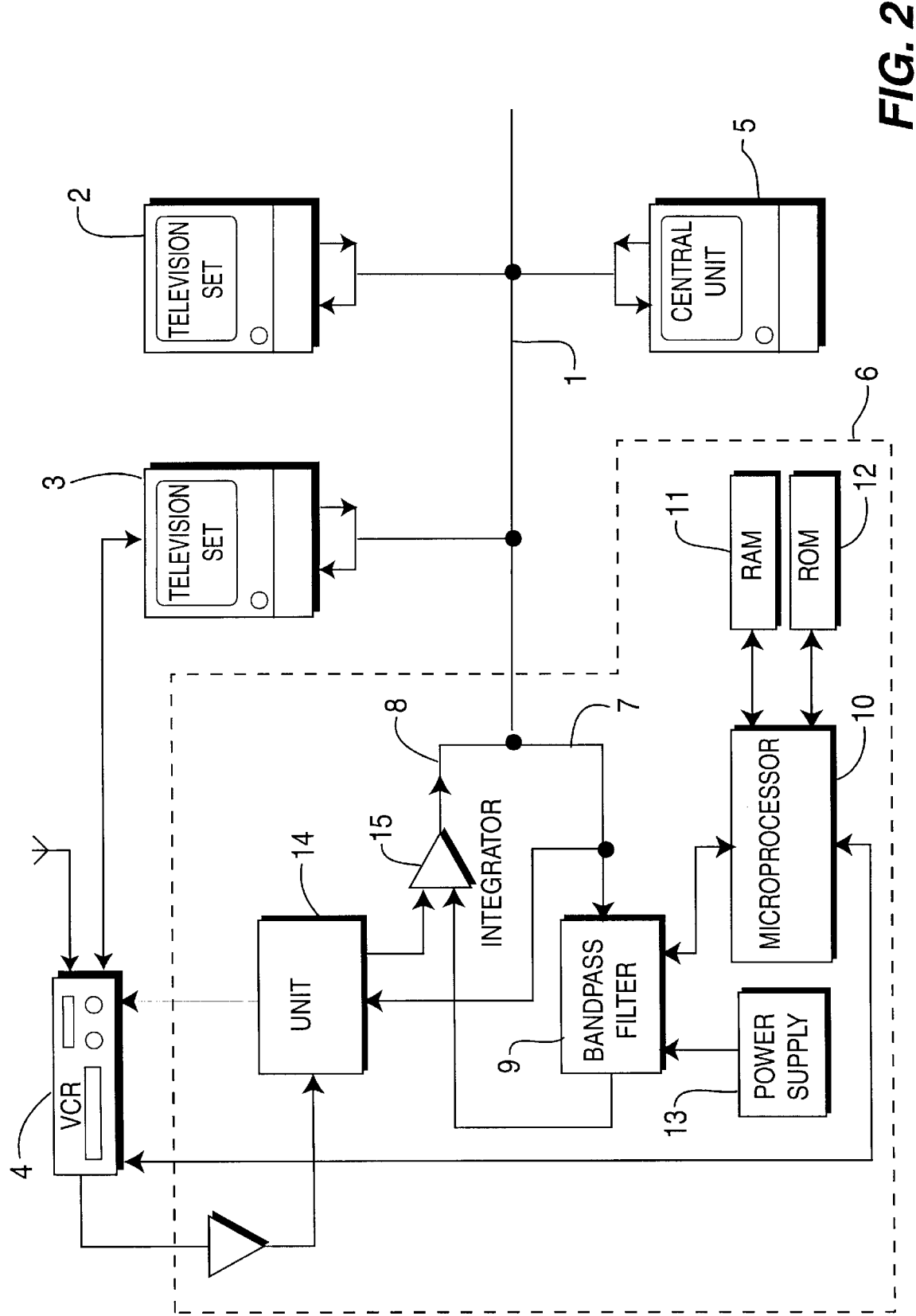
FIG. 2 shows a block diagram showing more details of a home systems network.

FIG. 2 shows details of some components of the home systems network in FIG. 1. The transmission bus 1 connects appliances 2, 3 and 4, the outline in broken lines 6 representing the interface between bus 1 and VCR 4. Only one interface has been shown, to facilitate reading the diagrams. Obviously, similar interfaces are used to connect other appliances in the network.

The network shown is conform with the "Home Systems Specification" produced by the European Home Systems Association (EHSA), Mar. 15/24, 1992.

According to this embodiment example, bus 1 consists of a double coaxial cable as specified in the "Home Systems Specification Coaxial Cable", in the EHSA document. Conceptually, data streams are defined on the input side of one of the appliances shown representing a wide band input stream, and on the output side representing a wide band output stream. The wide band spectrum varies from 0 Hz to 860 MHz, the DC component being reserved for a 15 Volt DC power supply, the frequency band up to 1 MHz being reserved for the transmission of service data ("datagrams"), and the band from 40 MHz to 860 MHz being reserved for the transmission of high throughput video signals and data.

Input and output streams are shown on FIG. 2 by lines 7 and 8 respectively. The input stream is filtered by a base band filter 9 to extract service data transmitted by microprocessor 10. This microprocessor is connected to a RAM 11 and a ROM 12. The microprocessor uses RAM 11 to memorize information originating from other appliances in the network, particularly orders from a central unit 5.

The microprocessor is also connected to a ROM 12 that contains service data analysis and processing routines. The microprocessor appropriately controls the VCR functions. The filter 9 is also connected to a DC power supply 13.

The output stream is also transmitted to a channel allocation unit 14. This unit is connected to the VCR 4, both in input and in output. In particular, it does the base band—transmission channel and transmission channel—base band transpositions. The output signal from unit 14 is combined with service data from filter 9 at the amplifier integrator 15, thus outputting the input stream.

According to this embodiment example, the central unit is integrated in a television receiver, but it may also be integrated in any other type of appliance or be connected independently to the network. The screen on this receiver displays interactive menus allowing the User to control operation of the network.

In particular, the central unit can perform the following actions:

check if an appliance is switched on or is on standby, switch an appliance On/Off or put it on standby, activate a video transmission source.

Furthermore, the central unit has a list of appliances connected to the network. This list is regularly updated to take account of newly connected or disconnected appliances. The appliance enrolment and address assignment procedure is described in more detail in the Network Management section of EHSA document, which was mentioned above. This application does not cover this type of procedure.

The type of network appliances is identified by a descriptor. Some video sources include a VCR as source (2502 descriptor), a video modulator, a video camera (3D01), etc.

Receivers may include a video printer (0501), a VCR acting as a recorder (2501), a video tuner, etc.

Note that in the example shown, the interface between the VCR 4 and the bus 1 is shown as being external to the VCR for reasons of clarity. Obviously, this interface could be integrated into the VCR or another appliance, which in particular would have the advantage of allowing the use of circuits internal to the VCR, such as a microprocessor or microcontroller.

When a video source outputs a signal on a SCART connector, the DC voltage on pin 8 of this connector is 12 V.

Figure 3:
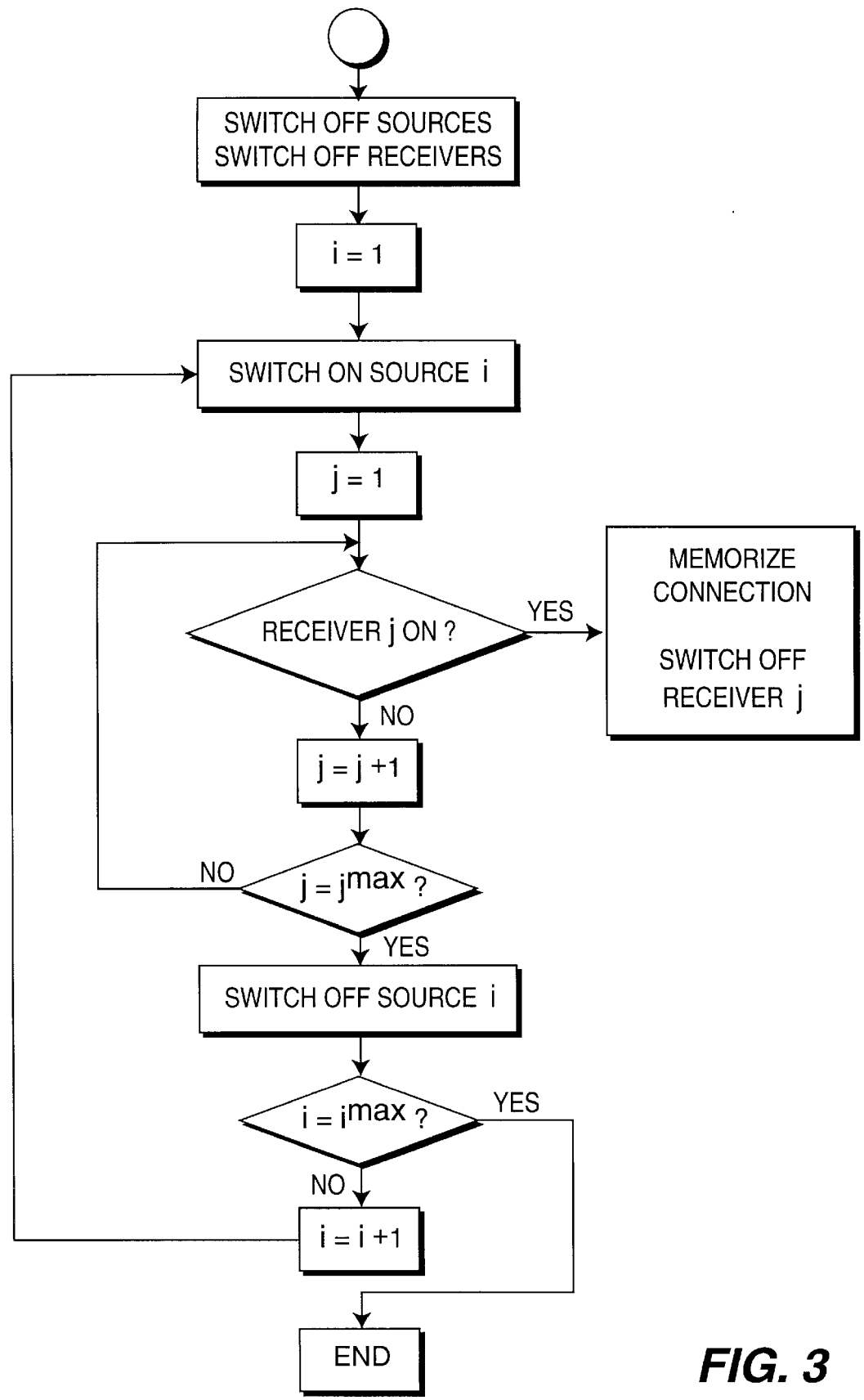
FIG. 3 shows a flowchart for the process in accordance with the invention.

FIG. 3 shows a flowchart for a specific example of the process according to the invention.

Initially, the central unit puts all video sources and all video receivers into standby mode.

The case of each source will be treated independently. The central unit switches on the first video source, then initiates sending a video signal from this source. In this example, this source is a VCR in which it is assumed that there is a cassette. Obviously, a modulator integrated into the VCR could also be used to supply a video signal.

The central unit then reviews all video receivers. If a receiver is switched on, then there is a SCART connection between this receiver and the video source.

The video source is then disactivated, and any receivers that are switched on are put on standby. The process is repeated for the next video source.

The notation used for the flowchart numbers sources from 1 to imax, and receivers from 1 to jmax. If either of the two values imax or jmax is zero, the algorithm will not be applied since the type of connection being searched for does not exist in the network.

The network shown on FIG. 2 will give rise to an exchange of the following commands when the process according to this example is put into application. It is assumed that the VCR 4 is the only video source on the network, the receivers being television sets 2 and 3. VCR 4 can also be considered as a receiver. However, since it is the only source, its status will not be tested in this example. The central unit 5 is denoted UC, television sets 2 and 3 are denoted TV1 and TV2 respectively, and the VCR is denoted VCR.

| From | To | Command | Comment |
|------|-----|--------------------|-------------------------|
| UC | TV1 | POWER, write, standby | TV1 put on standby |
| UC | TV2 | POWER, write, standby | TV2 put on standby |
| UC | VCR | POWER, write, standby | VCR put on standby |
| UC | VCR | MODE, write, play | VCR switched on and put into record mode |
| UC | TV1 | POWER, read-request | TV1 status read by UC |

-continued

| From | To | Command | Comment |
|------|----|---------|---------|
| TV1 | UC | POWER, read-request standby | TV1 sends its status to UC. UC determines that there is no SCART connection between VCR and TV1 |
| UC | TV2 | POWER, read-request | UC reads the status of TV2 |
| TV2 | UC | POWER, read-response, ON | TV2 sends its status to UC, which determines that there is a SCART connection between VCR and TV2 |
| UC | TV2 | POWER, write, standby | Put TV2 back into standby mode |
| UC | VCR | POWER, write, standby | Put VCR back into standby mode |

After this procedure has been applied, the central unit has a complete map of SCART connections in the network. Obviously, these are the SCART connections that switch on an appliance. When the central unit activates a given source on, it can thus send appropriate orders to appliances connected to this source.

If an appliance does not react to a voltage on SCART connector pin 8, no connection will be detected. If this type of appliance is not switched on accidentally, this failure to detect does not have any undesirable effects.

In an alternative embodiment, the process according to the invention is used when a new video source or a new receiver is installed in the network. The process is only used when the appliance type is such that it could add another SCART type connection.

In an alternative embodiment, the process is switched on at the initiative of the User.

In an alternative embodiment, all video sources are distributed in several groups. Instead of switching on a single source at any one time, the entire group of sources is switched on at the same time. If no receivers are switched on, there will be no SCART connection for this group of sources. If at least one receiver is switched on, the sources in this group are processed independently to determine existing connections. This alternative embodiment makes it possible to process a large number of appliances more quickly.

In an alternate embodiment, a pyramid search is made for SCART type connections. Initially, all video sources on the network are activated. If no receivers are switched on, then no connection will be detected. If some receivers are switched on, video sources are distributed into at least two groups of sources. The same operation is repeated for each group of sources: all sources in the group are activated, then possible separation into sub-groups. This division may be continued down to individual sources, or may stop when a group contains a limited number of sources which will be processed as a single source.

In an alternative embodiment, the User may inform the central unit directly of connections. The process according to the invention is then used to verify that the data input are correct and to make a correction, if necessary.

We claim:

1. Process for the detection of SCART type connections in a home systems network, including the following steps:
    a) deactivate video sources connected to the network,
    b) put video receivers connected to the network on standby,
    c) send a video signal from a first video source,
    d) detect switched on video receivers,
    e) memorize the connection between the said first source and the said switched on video receivers, if any,
    f) disactivate the first said source, and put switched on video receivers on standby,
    g) repeat the process starting from step c, with each remaining source.

2. Process according to claim 1, used when a new video source or a new video receiver is installed in the network.

3. Process according to claim 1 used at the initiative of the User.

4. Process according to claim 1 wherein connections are memorized to put video receivers on standby, if they were accidentally switched on at the same time as switching on a video source for which these connections exist.

5. Process for the detection of SCART type connections in a home systems network, including the following steps:
    a) deactivate video sources connected to the network,
    b) put video receivers connected to the network on standby,
    c) send a video signal from a group of video sources,
    d) detect if no video receivers are switched on, and in this case disactivate the video sources in the said group and repeat step c with the next group of video sources,
    e) if at least one switched on video receiver is detected, detect connections for this group of video sources using the method described above, the said group being considered as forming all video sources in the network for application of the said process,
    f) repeat step c, with the next group of video sources.

6. Process for the detection of SCART type connections in a home systems network, including the following steps:
    a) put video receivers connected to the network on standby,
    b) send video signals from all video sources in the network,
    c) detect whether or not any video receivers are switched on,
    d) if there are no video receivers switched on, conclude that no such connections exist,
    e) if there are any video receivers switched on, distribute video sources on the network into at least two groups and proceed with the following steps:
    f) put video receivers connected to the network on standby,
    g) for each group, send a video signal from the sources in the said group,
    h) detect whether or not any video receivers are switched on,
    i) if there are no video receivers switched on, conclude that no such connections exist,
    j) If there are some video receivers switched on, separate the said sources belonging to each group, into sub-groups:
    k) repeat steps f to j for each group, sub-group or smaller set until all sets formed contain a limited number of video sources.

* * * * *